United States Patent
Götze et al.

(10) Patent No.: US 12,375,020 B2
(45) Date of Patent: Jul. 29, 2025

(54) ARRANGEMENT AND METHOD FOR SUPPLYING ENERGY TO A CONTROL DEVICE

(71) Applicant: SEMIKRON DANFOSS ELEKTRONIK GMBH & CO. KG, Nuremberg (DE)

(72) Inventors: Thomas Götze, Höchstadt (DE); Peter Lemke, Schwabach (DE)

(73) Assignee: SEMIKRON DANFOSS ELEKTRONIK GMBH & CO. KG, Nuremberg (DE)

(*) Notice: Subject to any disclaimer, the term of this patent is extended or adjusted under 35 U.S.C. 154(b) by 146 days.

(21) Appl. No.: 18/384,829

(22) Filed: Oct. 27, 2023

(65) Prior Publication Data

US 2024/0154556 A1 May 9, 2024

(30) Foreign Application Priority Data

Nov. 8, 2022 (DE) ............ 10 2022 129 450.1

(51) Int. Cl.
*H02M 1/44* (2007.01)
*H02P 23/14* (2006.01)
*H02P 27/06* (2006.01)

(52) U.S. Cl.
CPC .............. *H02P 23/14* (2013.01); *H02P 27/06* (2013.01)

(58) Field of Classification Search
CPC ........ H02P 23/14; H02P 27/06; H02P 29/024; H02P 29/032
See application file for complete search history.

(56) References Cited

U.S. PATENT DOCUMENTS

| | | | | |
|---|---|---|---|---|
| 2004/0022002 A1* | 2/2004 | Kollar | ............ | H02H 9/041 361/105 |
| 2015/0311696 A1* | 10/2015 | Zhu | ............ | H02H 3/207 361/21 |
| 2018/0029484 A1* | 2/2018 | Boesing | ............ | B60L 53/24 |

* cited by examiner

*Primary Examiner* — Muhammad S Islam
(74) *Attorney, Agent, or Firm* — Andrew F. Young, ESQ; Nolte Lackenbach Siegel

(57) ABSTRACT

An arrangement and methods for operating and for determining the speed of an electrical machine connected to a power electronic switching device and for supplying energy to a control device of the power electronic switching device. The arrangement and methods have an inductive decoupling device arranged on an electrical conductor leading from the switching device to the electrical machine, wherein a frequency determination device is used to determine the frequency of a voltage associated with a current in the electrical conductor and thus indirectly the speed of the electrical machine, and wherein a rectified output voltage of the decoupling device forms a voltage source for the control device.

12 Claims, 2 Drawing Sheets

ARRANGEMENT AND METHOD FOR SUPPLYING ENERGY TO A CONTROL DEVICE

CROSS REFERENCE TO RELATED APPLICATIONS

This application relates to and claims priority to DE 10 2022 129 450.1 filed Nov. 8, 2023, the entire contents of which are incorporated herein fully by reference.

FIGURE SELECTED FOR PUBLICATION

FIG. 1.

BACKGROUND OF THE INVENTION

Field of the Invention

The invention describes an arrangement both for supplying energy to a control device of a power electronic switching device and for determining the speed of an electrical machine connected to the switching device. The invention further describes methods for this.

Description of the Related Art

Converter systems for road vehicles, in particular passenger cars, must comply with ISO 26262 requirements for so-called functional safety. In particular, when synchronous machines with permanent magnets are used as drive motors, the so-called all phase short circuit ("ASC"—all phase shortcut) is considered to be an appropriate measure in the event of a fault. During this measure, it is necessary to supply energy to the control device of the converter. In addition, it would be advantageous to know the speed of the drive motor during the measure.

DE19835576A1 discloses a control system for a permanently excited electric motor having at least one winding phase, comprising a half-bridge arrangement for each winding phase of the motor, an intermediate circuit connecting each half-bridge arrangement to a motor supply voltage source, a control arrangement for controlling each half-bridge arrangement, wherein, according to the control by means of the control arrangement, each half-bridge arrangement applies or can apply a voltage or a potential of predetermined polarity to that winding phase of the electric motor which is associated with this half-bridge arrangement for a predetermined period of time, an operating state detection arrangement at least for detecting an operating state of the control system or/and the electric motor, wherein the control arrangement is designed, when the presence of at least one predetermined operating state is detected by the operating state detection arrangement in the control system or/and the electric motor, to generate a command for generating a short circuit between each connection of the motor.

ASPECTS AND OBJECTS OF THE INVENTION

At least one of the objects of the present invention is to provide an improvement over the related art.

According to one alternative and adaptive aspect of the invention an arrangement and methods for operating and for determining the speed of an electrical machine connected to a power electronic switching device and for supplying energy to a control device of the power electronic switching device. The arrangement and methods have an inductive decoupling device arranged on an electrical conductor leading from the switching device to the electrical machine, wherein a frequency determination device is used to determine the frequency of a voltage associated with a current in the electrical conductor and thus indirectly the speed of the electrical machine, and wherein a rectified output voltage of the decoupling device forms a voltage source for the control device.

The invention is based on the object of presenting both methods and an arrangement having a control device, having a converter, more generally a switching device, and having an electrical machine, which can supply the control device with energy in the event of a fault and at the same time can determine the speed of the electrical machine.

This object is achieved according to the invention by an arrangement for determining the speed of an electrical machine connected to a power electronic switching device and preferably for supplying energy to a control device of the power electronic switching device, having an inductive decoupling device arranged on an electrical conductor leading from the switching device to the electrical machine, wherein a frequency determination device is used to determine the frequency of a voltage associated with a current in the electrical conductor and thus indirectly the speed of the electrical machine, and wherein an output voltage, preferably a rectified output voltage, of the decoupling device preferably forms a voltage source for the control device.

In a preferred configuration, the decoupling device is in the form of a coil that is arranged around the electrical conductor and preferably has a magnetic core at least partially comprising the associated conductor.

It may be advantageous if the voltage source has a buffer capacitor.

It may also be advantageous if the electrical conductor carries alternating current during operation.

It is particularly preferred if the switching device is in the form of a bridge circuit having a plurality of partial bridge circuits connected in parallel and each partial bridge circuit has an upper partial branch and a lower partial branch, wherein the center tap of the respective partial bridge circuit is connected to an associated electrical conductor. Here, each of the partial bridge circuits may be in the form of a two-level, three-level or multilevel circuit.

The object is further achieved by a method for supplying energy to the control device of the power electronic switching device for controlling the electrical machine connected thereto, wherein the rectified output voltage of the inductive decoupling device forms the voltage source of the control device and thus supplies the control device with energy.

The object is further achieved by a method for determining the speed of an electrical machine connected to a switching device, wherein the frequency determination device is used to determine the frequency of the output voltage of the inductive decoupling device and thus the speed of the electrical machine.

In these methods, it may be advantageous if at least two upper partial branches or at least two lower partial branches are turned on at the same time and a decoupling device is arranged on at least one of the associated electrical conductors.

It may also be preferable if the electrical machine operates in the regenerative mode while the method is being carried out.

Of course, unless this is explicitly excluded or excluded per se or contradicts the concept of the invention, the features mentioned in the singular in each case, in particular the frequency determination device, can be present several times in the arrangement according to the invention.

It goes without saying that the various configurations of the invention, regardless of whether they are mentioned in connection with the arrangement or with the methods, can be realized individually or in any combinations in order to achieve improvements. In particular, the features mentioned and explained above and hereinafter can be used not only in the combinations indicated, but also in other combinations or by themselves, without departing from the scope of the present invention.

Further explanations of the invention, advantageous details and features are apparent from the following description of the exemplary embodiments of the invention schematically illustrated in FIGS. 1 to 4, or of respective parts thereof.

The above and other aspects, features, objects, and advantages of the present invention will become apparent from the following description read in conjunction with the accompanying drawings for exemplary but nonlimiting embodiments, in which like reference numerals designate the same elements.

DETAILED DESCRIPTION OF THE PREFERRED EMBODIMENTS

Figure 1:
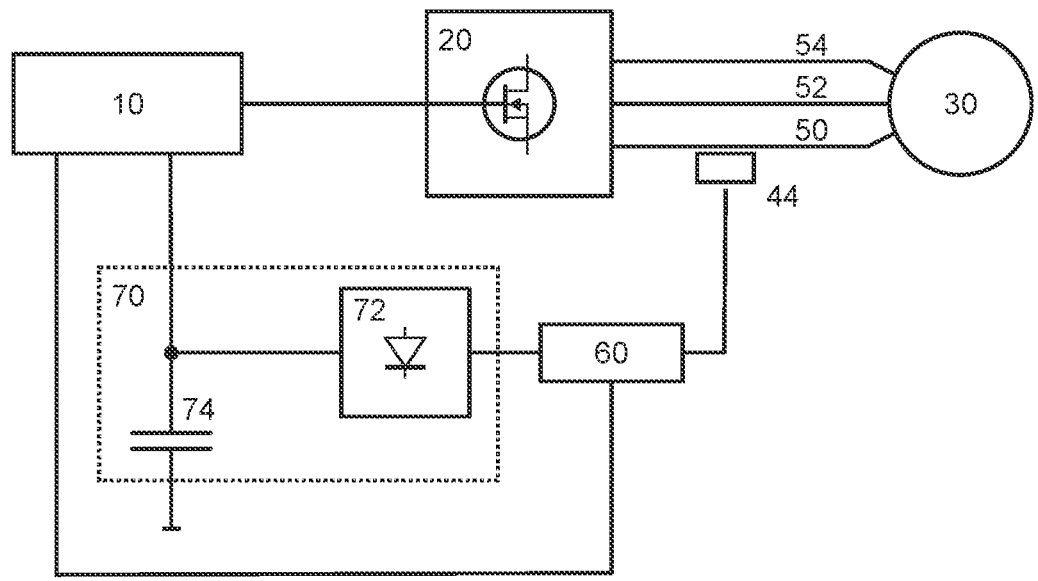
FIG. 1 shows a first configuration of an arrangement according to the invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' or 'bond' or and similar terms do not necessarily denote direct and immediate connections, but also include connections through intermediate elements or devices. For purposes of convenience and clarity only, directional (up/down etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

FIG. 1 shows a schematic illustration of a first configuration of an arrangement according to the invention, as is preferably part of an electrical drive system for vehicles, in particular for passenger transport or for load transport. There is an illustration of a control device 10 for controlling a power electronic switching device 20 which is in the form of a converter here, more precisely a multi-phase, here three-phase, inverter, the power semiconductor components of which are in the form of MOS-FETs. This inverter is connected to an electrical machine 30 by means of three electrical conductors 50, 52, 54. In the normal driving mode, an alternating current generated by means of the inverter flows in these electrical conductors 50, 52, 54 with an associated AC voltage, wherein one phase of the three phases is assigned to each electrical conductor 50, 52, 54.

According to the invention, an inductive decoupling device 44 is arranged on one of the electrical conductors 50. This decoupling device 44 is arranged adjacent to one of the electrical conductors 50, wherein the AC voltage of an alternating current flowing there is inductively coupled into the coil and generates an induction voltage there.

The frequency of the induction voltage is determined in the frequency determination device 60 and is supplied to the control device 10 as a determined frequency directly or after evaluation as a speed of the electrical machine 30 that is determined from the frequency. Thus, the speed of the electrical machine is then available in the control device 10 after evaluation or directly.

This information about the speed of the electrical machine 30 is available during its motor operation, that is to say in particular during normal operation of the vehicle, and can be processed further. The same information about the speed of the electrical machine 30 is available in the control circuit 10 even if the electrical machine 30, in the event of a fault in the drive system, is operating in the regenerative mode, cf. FIGS. 3 and 4.

The induction voltage is also supplied to a circuit which rectifies the induction voltage by means of a rectifier 72 and buffers it by means of a buffer capacitor 74. This results in a voltage source 70 for the control device 10, which supplies the control device 10 with energy in particular in the event of failure of a normal voltage supply device. This energy supply is therefore available, especially in the event of a fault, but can also be used during normal operation.

Figure 2:
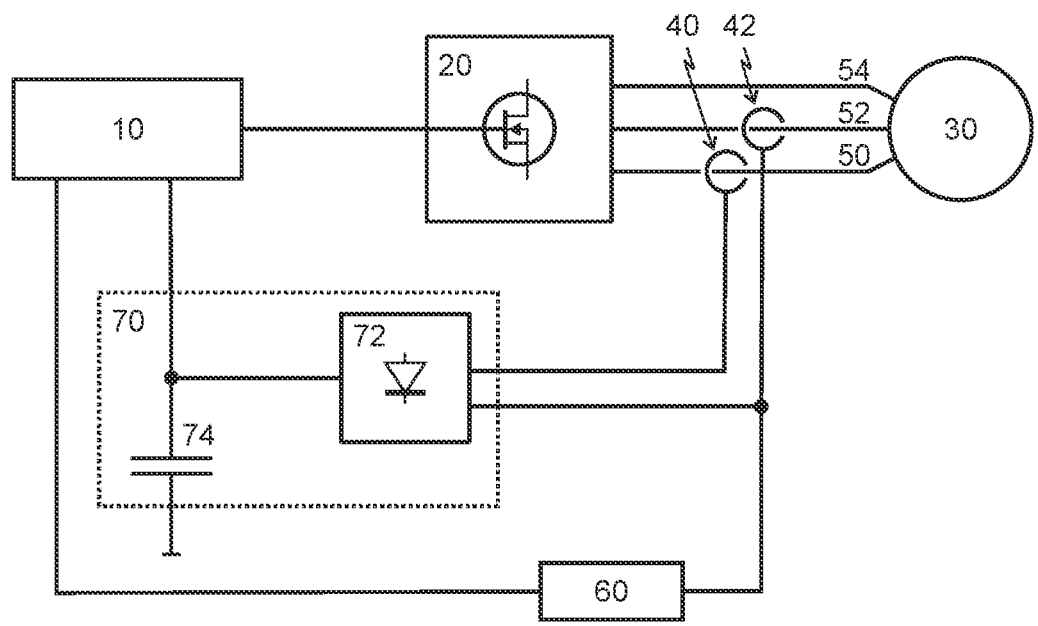
FIG. 2 shows a second configuration of an arrangement according to the invention.

FIG. 2 shows a schematic illustration of a second configuration of an arrangement according to the invention. Here, the control device 10, the power electronic switching device 20, the electrical conductors 50, 52, 54 and the electrical machine 30, as well as their functional interaction, are identical to the description given in FIG. 1.

In contrast to FIG. 1, two decoupling devices 40,42 are provided here and are arranged on two different electrical conductors 50,52. For the best yield of decoupled energy, it is advantageous to provide at least one decoupling device in each case on all electrical conductors 50, 52, 54. Two decoupling devices are sufficient in most applications for the redundant determination of the speed of the machine 30.

Illustrated here is a preferred minimum configuration which can decouple sufficient energy and can also determine the speed of the electrical machine 30. For energy generation, both decoupling devices 40,42 are connected to a rectifier 72 here. Its function, as well as the function and use of the voltage source 70 with this rectifier 72, is identical to that described in FIG. 1.

In order to determine the frequency, a frequency determination device 60 is connected in parallel with the voltage source 70, in contrast to the serial circuit according to FIG. 1.

The respective decoupling device 40,42 itself has a magnetic core with air gap comprising the assigned conductor 50,52. The coil is arranged around this magnetic core using toroidal core winding technology.

Figure 3:
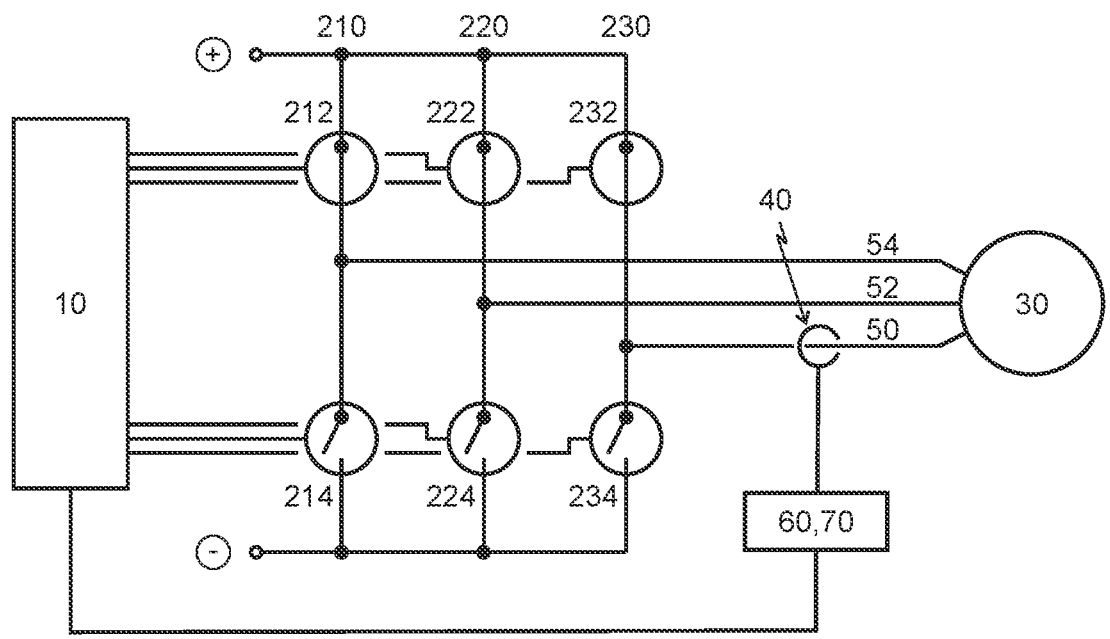
FIG. 3 shows an arrangement according to the invention during a first configuration of a method according to the invention.

FIG. 3 shows an arrangement according to the invention during a first configuration of a method according to the invention. Illustrated here are the three partial bridge circuits 210, 220, 230 of a three-phase two-level inverter fed from a DC link. In this case, each partial bridge has an upper partial branch 212, 222, 232 and a lower partial branch 214, 224, 234. Without restricting generality, all switches of the respective partial branches are connected here to a common control device 10. Each schematically illustrated partial branch 212, 214, 222, 224, 232, 234 may also be more complex, for example in the form of a partial branch of a three-level inverter.

In the event of a fault in a drive system of a vehicle, the above-mentioned all-phase short circuit is a possible reaction. A variant of the implementation is illustrated here, wherein all upper partial branches 212, 222, 232 are turned on at the same time. In this fault case, the electrical machine 30 operates in the regenerative mode and generates a current and a voltage, more precisely an alternating current and an AC voltage, in the electrical conductors 50, 52, 54.

In this configuration, the AC voltage in one of the electrical conductors 50 generates an induction voltage in a decoupling device 40. As fundamentally described in FIG. 1 or 2, this induction voltage feeds a voltage source 70 which now supplies the control circuit 10 with energy independently of its voltage supply during normal operation. Alternatively, the voltage source 70 can also form an additional supply.

This induction voltage also feeds the frequency determination device 60 which, as also described in FIG. 1 or 2, is used to determine the speed of the electrical machine 30, for which the frequency determination device 60 is connected to the control device 10.

Figure 4:
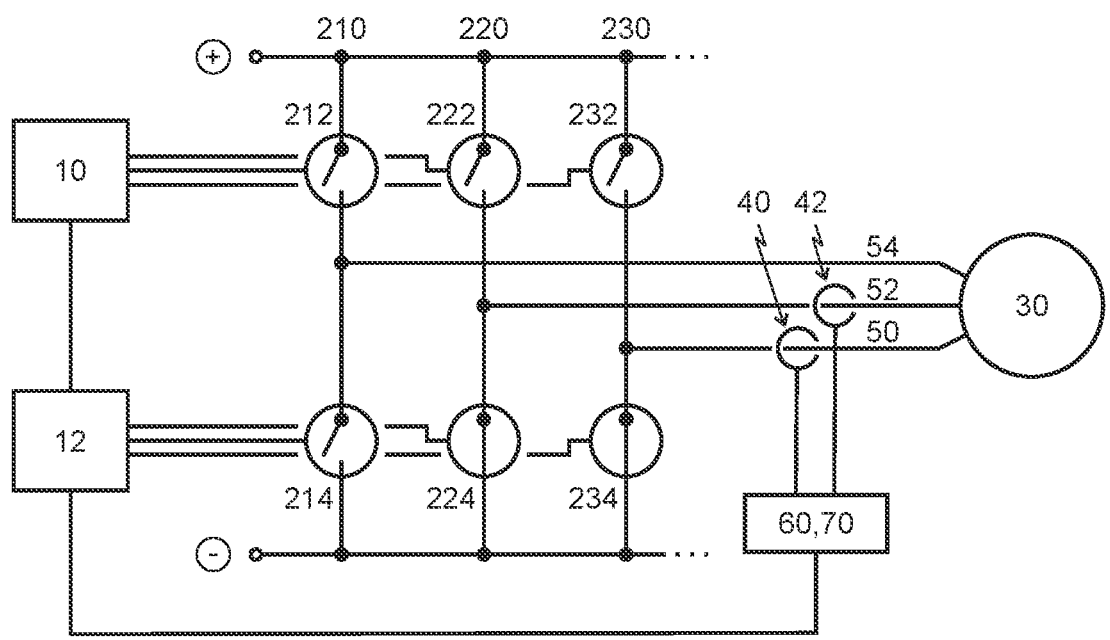
FIG. 4 shows a further arrangement according to the invention during a second configuration of a method according to the invention.

FIG. 4 shows a further arrangement according to the invention during a second configuration of a method according to the invention. The inverter illustrated here has more than three phases which may also be designed to be equally flexible, as described for FIG. 3.

In the configuration illustrated here, only two, here two lower, partial switches 224,234 are turned on at the same time in the event of a fault. This is a modification of the above-mentioned method of the all-phase short circuit. With this modification, at least two upper, or as illustrated here two lower, partial branches are turned on at the same time.

The two decoupling devices 40,42 are arranged here on those electrical conductors 50,52 which are connected to those partial bridge circuits 210, 220, 230 whose partial branches 224,234 are turned on at the same time.

In contrast to FIG. 3, a control device 10,12 is respectively provided here for all upper partial branches 212, 222, 232 and a further control device is provided for all lower partial branches 214, 224, 234. Here, it is advantageous if both the frequency determination device 60 and the voltage source 70 are connected to that control circuit 12 which controls the partial branches 224,234 which are turned on at the same time. However, the frequency determination device 60 may be connected only or additionally to the other control device 10.

The frequency determination device 60 as well as the voltage source 70 are also designed as described in FIG. 1 or 2. The decoupling device 40,42 is designed as described in FIG. 2.

Also, the inventors intend that only those claims which use the specific and exact phrase "means for" are intended to be interpreted under 35 USC 112. The structure herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure covers modifications and variations of this disclosure provided they come within the scope of the appended claims and their equivalents.

What is claimed is:

1. An arrangement for determining a speed of an electrical machine connected to a power electronic switching device and for supplying energy to a control device of the power electronic switching device, comprising:
   an inductive decoupling device arranged on an electrical conductor leading from the power electronic switching device to the electrical machine;
   a frequency determination device configured to determine a frequency of a voltage associated with a current in the electrical conductor and to indirectly determine the speed of the electrical machine; and
   wherein an output voltage, including at least a rectified output voltage, of the decoupling device forms a voltage source for the control device.

2. The arrangement, according to claim 1, wherein:
   the decoupling device is a coil that is arranged around the electrical conductor and has a magnetic core at least partially comprising the respective associated conductor.

3. The arrangement, according to claim 2, wherein:
   the voltage source has a buffer capacitor.

4. The arrangement, according to claim 3, wherein:
   the electrical conductor carries alternating current during operation.

5. The arrangement, according to claim 4, wherein:
   the switching device is a bridge circuit having a plurality of partial bridge circuits connected in parallel and each partial bridge circuit has an upper partial branch and a lower partial branch; and
   wherein a center tap of the respective partial bridge circuit is connected to an associated electrical conductor.

6. The arrangement, according to claim 5, wherein:
   each of the partial bridge circuits is in the form of one of a two-level circuit, a three-level circuit, and a multi-level circuit.

7. A method for determining a speed of an electrical machine connected to a switching device, comprising the steps of:
   providing an arrangement for determining the speed of the electrical machine connected to said power electronic switching device and for supplying energy to a control device of the power electronic switching device, comprising:
      an inductive decoupling device arranged on an electrical conductor leading from the power electronic switching device to the electrical machine;
      a frequency determination device configured to determine a frequency of a voltage associated with a current in the electrical conductor and to indirectly determine the speed of the electrical machine;
      wherein an output voltage, including at least a rectified output voltage, of the decoupling device forms a voltage source for the control device; and
   using the frequency determination device to determine the frequency of the output voltage of the inductive decoupling device and thus the speed of the electrical machine.

8. The method, according to claim 7, wherein:
the decoupling device is a coil that is arranged around the electrical conductor and has a magnetic core at least partially comprising the respective associated conductor;
the voltage source has a buffer capacitor;
the electrical conductor carries alternating current during operation;
the switching device is a bridge circuit having a plurality of partial bridge circuits connected in parallel and each partial bridge circuit has an upper partial branch and a lower partial branch;
a center tap of the respective partial bridge circuit is connected to an associated electrical conductor;
each of the partial bridge circuits is in the form of one of a two-level circuit, a three-level circuit, and a multi-level circuit;
a decoupling device is arranged on at least one of the associated electrical conductors; and
turning on at least two upper partial branches or at least two lower partial branches on at the same time.

9. The method, according to claim 8, further comprising the step of:
operating the electrical machine in a regenerative mode.

10. A method, for supplying energy to a control device of a power electronic switching device controlling an electrical machine connected thereto, comprising the steps of:
providing an arrangement for determining the speed of the electrical machine connected to said power electronic switching device and for supplying energy to a control device of the power electronic switching device, comprising:
an inductive decoupling device arranged on an electrical conductor leading from the power electronic switching device to the electrical machine;
a frequency determination device configured to determine a frequency of a voltage associated with a current in the electrical conductor and to indirectly determine the speed of the electrical machine;
wherein an output voltage, including at least a rectified output voltage, of the decoupling device forms a voltage source for the control device;
using the frequency determination device to determine the frequency of the output voltage of the inductive decoupling device and thus the speed of the electrical machine;
using a rectified output voltage of the inductive decoupling device that forms the voltage source of the control device; and
supplying energy to the control device.

11. The method, according to claim 10, wherein:
the decoupling device is a coil that is arranged around the electrical conductor and has a magnetic core at least partially comprising the respective associated conductor;
the voltage source has a buffer capacitor;
the electrical conductor carries alternating current during operation;
the switching device is a bridge circuit having a plurality of partial bridge circuits connected in parallel and each partial bridge circuit has an upper partial branch and a lower partial branch;
a center tap of the respective partial bridge circuit is connected to an associated electrical conductor;
each of the partial bridge circuits is in the form of one of a two-level circuit, a three-level circuit, and a multi-level circuit;
a decoupling device is arranged on at least one of the associated electrical conductors; and
turning on at least two upper partial branches or at least two lower partial branches on at the same time.

12. The method, according to claim 11, further comprising the step of:
operating the electrical machine in a regenerative mode.

* * * * *